3,773,803
PROCESS OF PREPARATION OF 21-SULFATE AND
21-PHOSPHATE ESTERS OF CORTICOSTEROIDS
Ivan Villax, 3 Travesso do Ferreiro, Lisbon, Portugal
No Drawing. Filed May 26, 1972, Ser. No. 257,321
Claims priority, application Portugal, June 5, 1971,
55,887
Int. Cl. C07c *169/34*
U.S. Cl. 260—397.45                                      11 Claims

ABSTRACT OF THE DISCLOSURE 21-sulfate and phosphate esters of corticosteroids are prepared by reacting the respective 21-diiodo compounds with a sodium or potassium salt, a tertiary amine addition salt of a mineral oxyacid followed by neutralization of the remaining acid functions of the product.

---

The 21-sulfate and 21-phosphate mono-esters of corticosteroids have considerable importance in view of the fact that the monosodium, disodium and potassium salts are soluble in water thereby permitting parenteral administration as well as the preparation of ointments from which are better absorbed after topic administration. Moreover, they become finely dispersed in the stomach, when administered orally, which diminishes considerably the occurrence of gastric hemorrhages.

The preparation of the 21phosphate esters of corticosteroids was first described in U.S. Pat. 2,939,873 (1960). Irmscher has also described another process for preparing the 21phosphates of steroids in "Chemistry & Industry" (July 8, 1961, page 1035). German Pat. 1,066,581 (1960) describes the preparation of the 21-sulfate of prednisolone, while U.S. Pat. 3,564,028 (1971) describes another process for preparing the 21-phosphates and 21-sulfates of steroids. The last named patent prepares, for the first time, the phosphate esters of the 16β-alkyl steroids, namely those of betamethasone.

All these processes start from the 21-hydroxylated compounds and esterification is accomplished through at the least two additional reactions.

U.S. Pat. 2,939,873 teaches preparing the 21-mesylates starting from the 21-hydroxylated steroids and, subsequently, prepares the 21-monoiodo derivatives, which are then reacted with a tertiary amine salt of o-phosphoric acid with a view to preparing the 21-phosphates.

The present invention relates to the preparation of the 21-phosphates and sulfates of steroids and of the sodium and potassium salts thereof, which is accomplished directly without passing through the 21-hydroxylated derivatives, thereby reducing the reaction sequence by at least three steps, which fact represents a considerable economy in yield and time of processing.

The present process is based upon the fact that it has been found possible to directly obtain the 21-esters of inorganic oxyacids, such as, for example, those of sulfuric and phosphoric acid, by reacting the 21-diiodo steroids with a sodium or potassium salt, with a tertiary amine [e.g., a lower (1–10 carbon) trialkylamine] salt of sulfuric or phosphoric acid, or with a mixture thereof, yielding the inorganic 21-oxyacid mono-esters in a surprising way.

In view of the fact that the 2-diiodo derivatives are already known and are prepared before obtaining the 21-hydroxylated steroids in accordance with British Pats. 877,227 (1961) and 934,707 (1963) and U.S. patent application Ser. No. 98,202 (1970), now abandoned the present invention represents a practical industrial result with a view to shortening considerably the sequence and number of reactions necessary to prepare the 21-esters of oxyacids, in addition to the fact that the reaction of a 21-diiodo derivative with alkali metal salts or with tertiary amines of oxyacids produces a yield considerably higher than the corresponding reaction with a 21-monoiodo derivative.

The starting materials used to perform the invention are obtained according to the known processes as specified above. According to the present invention, there is provided a process for preparing the 21-phosphates and sulfate steroids, by reacting the 21-diiodo derivatives with an excess of dipotassium or disodium phosphate or with the addition salt containing 2 moles of triethylamine per mole or orthophosphoric acid in case of the 21-phosphates and with sodium bisulfate ($NaHSO_4$), or with triethylamine sulfate or with mixtures thereof in case of the 21-sulfates, in a reaction inert solvent medium, such as dimethylformamide, acetone, acetonitrile.

The reaction is carried out at the temperature of reflux. The addition to the reaction mixture of a small amount of water and of the corresponding free oxyacid improves the yield. A period of 1.5 to 4 hours is usually sufficient to complete the reaction, depending, of course, on the temperature of reflux, the reaction mixture and its pH (usually 5–8). The reaction is carried out, preferably, in the absence of light and under a nitrogen atmosphere.

The product is then isolated according to known processes, as a sodium or disodium salt or as a free acid, i.e., the function or functions of the non-esterified acid are not neutralized, followed by the preparation of the desired sodium or potassium salts, according to known processes.

Another feature of the present invention is that it permits the easy isolation of the 21-phosphate and sulfate esters as an addition salt with N,N'-dibenzylethylenediamine (DBED). These new derivatives are highly insoluble in water and permit preparation of long-acting pharmaceutical compositions. The N,N'-dibenzylethylenediamine salts of the 21-phosphoric and sulfuric esters of cortisones, when administered intramuscularly, maintain therapeutical useful blood levels for 7 to 10 days, and when administered orally, permit spacing the maintenance dosage with intervals of 24 to 48 hours. The preparation of the dibenzylethylenediamine derivatives is carried out either by precipitation of an aqueous solution of a steroid 21-oxyacid mono-ester sodium or potassium salt by adding an aqueous solution of N,N'-dibenzylethylenediamine acetate or lactate, or by neutralization of a solution of the respective 21-ester, the non-esterified acid function not being neutralized, with a solution of N,N'-dibenzylethylenediamine in an organic inert solvent medium.

The examples appearing hereinafter illustrate the various techniques of performing the present process of invention, however, they do not limit its scope.

EXAMPLE 1

5 g. of 21 - diiodo - 16β - methyl-9α-fluor-11β,17α-dihydroxy - 1,4 - pregnadiene-3,20-dione, the preparation of which is described in U.S. patent application Ser. No. 98,202, is refluxed in 50 ml. of acetone containing 0.5 ml.

of water, 5 g. of dipotassium phosphate and 0.3 ml. of 85% o-phosphoric acid, away from light and under a nitrogen atmosphere, with stirring for 3 hours. After the reaction has been completed, 1.8 g. of sodium bicarbonate in 25 ml. of water is added and the mixture is concentrated in vacuum until the acetone is eliminated. The solution is decanted and acidified with diluted hydrochloric acid, after which the 21-phosphate of betamethasone crystallizes as the free acid. The product is then filtered, washed and dried. Yield: 3.47 g., 92.5%. Specific rotation: $[\alpha]_D+100$ (c.=1% in methanol). Melting point 180°–183° C. with decomposition.

$E_{1\,cm.}^{1\%}$ 310 at 239 m$\mu$

EXAMPLE 2

1.2 g. of o-phosphoric acid neutralized with 5.8 ml. of triethylamine in 20 ml. of acetone and 40 ml. of acetonitrile are added to 3.2 g. 21-diiodo-16$\beta$-methyl-9$\alpha$-fluoro-11$\beta$,17$\alpha$ - dihydroxy-1,4-pregnadiene-3,20-dione in 40 ml. of acetone, and refluxed for 3.5 hours away from light and under a nitrogen atmosphere. Afterwards, the acetone is distilled and reflux is continued for a further 1.5 hours. The product is then vacuum distilled till dry and 50 ml. of diluted hydrochloric acid is added, after which the free acid of the 21-phosphate of betamethasone crystallizes. It is filtered and washed with a solute of sodium bisulfite and water. The product obtained is the same as that obtained in Example 1 and weighs 2.1 g.

$E_{1\,cm.}^{1\%}$ 314 at 239 m$\mu$

EXAMPLE 3

Example 2 is repeated, but adding 2 g. of disodium phosphate and 0.4 ml. of water. 2.33 g. of 21-phosphate of betamethasone are obtained. Yield 96.7%.

EXAMPLE 4

The product obtained in Example 1 is dissolved in methanol and the pH is adjusted with a cold solution of sodium hydroxide in methanol to 10.5. The addition of diethylether precipitates the 21 - phosphate of betamethasone as the disodium salt, which is very soluble in water and soluble in methanol. Specific rotation: $[\alpha]_D+105$.

$E_{1\,cm.}^{1\%}$ 288 at 239 m$\mu$

EXAMPLE 5

The product obtained in Example 2 is dissolved in methanol and 1 mole of N,N'-dibenzylethylenediamine per 2 moles of the 21-phosphate in a methanol solution is added. Afterwards, water is added until a complete precipitation of the new derivative N,N'-dibenzylethylenediamine bis (21 - phosphate of 16$\beta$ - methyl - 9$\alpha$-fluorprednisolone) occurs.

$E_{1\,cm.}^{1\%}$ 240 at 239 m$\mu$ calculated on the anhydrous substance. Specific rotation: $[\alpha]_D+80$ (c.=1% in methanol). pH of the 0.5% suspension: 5.9. The product is quite soluble in methanol and soluble in ethanol, tetrahydrofurane and dimethylformamide. Its solubility in water is 0.79 mg./ml.

EXAMPLE 6

Example 5 is repeated, but adding 1 mole of N,N'-dibenzylethylenediamine per mole of the acid 21-phosphate. The N,N'-dibenzylethylenediamine 21-phosphate derivative of betamethasone is obtained.

$E_{1\,cm.}^{1\%}$ 208 at 239 m$\mu$

EXAMPLE 7

A solution containing 2.0 g. of N,N'-dibenzylethylenediamine acetate in 20 ml. of water is slowly added, under stirring, to an aqueou solution (50 ml.) of 5 g. of 21-phosphate sodium of betamethasone. Precipitation and crystallization of N,N' - dibenzylethylenediamine bis(21-phosphate of 16$\beta$ - methyl-9$\alpha$-fluorprednisolone), which product is identical to that described in Example 5, occurs. Humidity by the Karl Fischer method: 4.8%.

EXAMPLE 8

The N,N'-dibenzylethylenediamine mono and bis(21-phosphates) of the following steroids can be prepared by the procedure of the foregoing examples:

Cortisone
Hydrocortisone
Prednisone
Prednisolone
Triamcinolone
Fluocinolone
Paramethasone
6$\alpha$-methylprednisolone
16$\alpha$-methyl-9$\alpha$-fluorprednisolone.

EXAMPLE 9

The procedure of Example 1 is followed, but adding 5 g. of potassium bisulfate instead of 5 g. of dipotassium phosphate, and 0.3 ml. of 80% sulfuric acid instead of 0.3 ml. of 85% of phosphoric acid. The 21-sulfate of betamethasone is obtained, whic is identical to that described in U.S. Pat. 3,564,028 (1971).

EXAMPLE 10

Example 7 is repeated, but using the betamethasone 21-sulfate sodium salt instead of the 21-phosphate sodium. The new N,N'-dibenzylethylenediamine bis(21-sulfate of 16$\beta$-methyl-9$\alpha$-fluorprednisolone) is obtained.

$E_{1\,cm.}^{1\%}$ 249 at 239 m$\mu$

EXAMPLE 11

Following the procedure of the above examples, one can prepare the N,N'-dibenzylethylenediamine salts of the 21-sulfates of:

Cortisone
Hydrocortisone
Prednisone
Prednisolone
Triamcinolone
Fluocinolone
Paramethasone
6$\alpha$-methylprednisolone
16$\alpha$-methyl-9$\alpha$-fluorprednisolone.

I claim:
1. A process for preparing 21-phosphate or 21-sulfate mono-esters of a cortisone selected from the group consisting of cortisone, hydrocortisone, prednisone, prednisolone, triamcinolone, fluocinolone, paramethasone, 6$\alpha$-methylprednisolone, 16$\alpha$ - methyl-9-$\alpha$-fluorprednisolone, 16$\beta$-methyl-9$\alpha$-fluorprednisolone, comprising reacting the respective 21-diiodo compound with a reactant selected from the group consisting of a sodium, potassium or lower trialkylamine salt of phosphoric acid, sulfur acid or mixtures thereof in a reaction inert medium, and isolating the desired mono-ester by neutralizing the non-esterified acid functions.

2. The process according to claim 1 wherein the reaction medium is acetone, dimethylformamide or acetonitrile.

3. The process of claim 1 wherein the desired mono-ester is isolated by neutralizing with N,N'-dibenzylethylenediamine.

4. The process of claim 1 wherein the lower trialkylamine is triethylamine.

5. The process of claim 1 wherein the reaction temperature is the temperature of reflux.

6. The process of claim 1 wherein the cortisone is 16$\beta$-methyl-9$\alpha$-fluorprednisolone and the neutralizing agent is N,N'-dibenzylethylenediamine thereby producing the N,N'-dibenzylethylenediamine salt of bis(2-phosphate or 21-sulfate of 16$\beta$-methyl-9$\alpha$-fluorprednisolone).

7. The N,N' - dibenzylethylenediamine salt of bis(21-phosphate of a cortisone), wherein said cortisone is selected from the group consisting of cortisone, hydrocortisone, prednisone, prednisolone, triacinolone, fluocinolone, paramethasone, 6α - methylprednisolone, and 16α-methyl-9α-fluorprednisolone.

8. The N,N'-dibenzylethylenediamine salt of bis(21-sulfate of a cortisone), wherein said cortisone is selected from the group consisting of cortisone, hydrocortisone, prednisone, prednisolone, triamcinolone, fluocinolone, paramethasone, 6α-methylprednisolone, and 16α-methyl-9α-fluorprednisolone.

9. The process of claim 1 wherein the phosphoric acid is o-phosphoric acid.

10. The N,N' - dibenzylethylenediamine salt of bis(21-phosphate of 16β-methyl-9α-fluorprednisolone).

11. The N,N'-dibenzylethylenediamine salt of bis(21-sulfate of 16β-methyl-9α-fluorprednisolone).

No references cited.

HENRY A. FRENCH, Primary Examiner

UNITED STATES PATENT OFFICE
CERTIFICATE OF CORRECTION

Patent No. 3,773,803            Dated November 20, 1973

Inventor(s) Ivan Villax

It is certified that error appears in the above-identified patent and that said Letters Patent are hereby corrected as shown below:

Column 3, line 72, for "aqueou" read -- aqueous --.

Column 4, line 23, for "whic" read -- which --; line 74, for "2" read -- 21 --.

Column 5, line 4, for "triacinolone" read -- triamcinolone --.

Signed and sealed this 17th day of September 1974.

(SEAL)
Attest:

McCOY M. GIBSON JR.                            C. MARSHALL DANN
Attesting Officer                             Commissioner of Patents